Reissued Sept. 6, 1938

Re. 20,845

UNITED STATES PATENT OFFICE 20,845

MOISTUREPROOF ARTICLE

William Hale Charch, Buffalo, N. Y., and Merlin Martin Brubaker and Frederick M. Meigs, Wilmington, Del., assignors, by mesne assignments, to E. I. du Pont de Nemours & Company, Wilmington, Del., a corporation of Delaware No Drawing. Original No. 2,098,538, dated November 9, 1937, Serial No. 758,657, December 21, 1934. Application for reissue May 10, 1938, Serial No. 207,152

11 Claims. (Cl. 91—68)

This invention relates to the art of moistureproofing. More particularly, it relates to a composition of matter suitable for the production of moistureproof materials and also to the moistureproof materials per se.

We believe that moistureproofing is due to (1) the use of an agent which is inherently moistureproof, and (2) the laying down of this agent in a continuous unbroken film, either alone or in combination with other materials or vehicles hereinafter called film-forming substances.

We have found, as a result of a large number of experiments, that substances are inherently moistureproof when they are of such a nature that they are not only insoluble in water but also dissolve none or at least only an infinitesimal amount of water. Apparently, water vapor diffuses through continuous unbroken films of such substances by a process of dissolving in the film and evaporating from the other side. The solubility of water in the moistureproofing agent largely determines the rate of transfusion of water vapor through the film, and therefore its inherent moistureproofness. Obviously, if the film is non-continuous and broken, other factors enter into the determination of the degree of moistureproofness.

We have found that amides of the type hereafter more fully described can be used in the preparation of moistureproofing compositions which will yield moistureproof films, i. e., coatings or self-sustaining films which are preferably also transparent, glossy, non-tacky, flexible, possess good surface slip, etc.

For the purposes of this specification and claims, we define moistureproof materials as those which, in the form of continuous unbroken sheets or films, permit the passage of not more than 570 grams of water vapor per 100 square meters per hour, over a period of 24 hours, at approximately 35° C.±0.2° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005'' to both sides of a sheet of regenerated cellulose of thickness approximately 0.0009'', will produce a coated product which is moistureproof.

For the purpose of experimental tests, especially for those materials adaptable as coating compositions, moistureproof materials include those substances, compounds or compositions which, when laid down in the form of a continuous unbroken film applied uniformly as a coating with a total coating thickness not exceeding 0.0005'' to both sides of a sheet of regenerated cellulose of thickness approximately 0.0009'', will produce a coated sheet which will permit the passage therethrough of not more than 570 grams of water vapor per 100 square meters per hour over a period of approximately 24 hours, at a temperature of 35° C.±0.2° C., with a water vapor pressure differential of 40–44 mm. (preferably 41.8±0.7 mm.) of mercury. For convenience, the number of grams of water vapor passed under these conditions may be referred to as "the permeability value". An uncoated sheet of regenerated cellulose having a thickness of approximately 0.0009'' will show a permeability value of the order of 5700.

From the foregoing, it is apparent that under the conditions set forth, a moistureproofed regenerated cellulose sheet is capable of resisting the passage of moisture or water vapor therethrough at least 10 times as effectively as the uncoated regenerated cellulose sheet.

We have specifically defined herein moistureproofness in terms of a permeability test performed at substantially 35° C. It is to be understood, however, that by the adoption of this condition no disclaimer is made of moistureproofness of any of the materials or compositions when tested at temperatures lower than 35° C. Likewise, no disclaimer is made of moistureproofing effects exhibited by the materials herein described at temperatures above 35° C. There will be a temperature for each moistureproofing agent above which neither it nor compositions containing it show substantial resistance to the passage of moisture. However, this behavior does not disqualify the materials herein described as moistureproofing agents.

The critical temperature above which these agents no longer exhibit moistureproof properties is dependent primarily upon the melting point of the material and upon the nature and composition of the film-forming substance with which it is used. Agents of higher melting points will show moistureproof properties up to higher temperatures than will agents of low melting points, other conditions being equal. Generally speaking, the agents of higher melting points will be preferred for this reason, though for certain other purposes it may be definitely advisable to use agents of lower melting points.

It is, therefore, an object of this invention to provide a composition of matter suitable for casting or coating purposes comprising a film-forming substance and an amide, more fully described hereafter, which will deposit a moistureproof film, i. e. a self-sustaining film or coating which is preferably also transparent, flexible, non-tacky, glossy and possesses good surface slip.

Another object of this invention is to provide moistureproof films, i. e., self-sustaining films or coatings containing amides which impart moistureproofness thereto, said films being preferably also transparent, flexible, non-tacky, glossy and possessing good surface slip.

Other objects will become apparent from the following description and appended claims.

The instant invention, in one phase thereof, contemplates a flowable composition of matter which will deposit a moistureproof film, i. e., self-sustaining film or coating which, in the preferred embodiment, is transparent (glass-clear), flexible, glossy, non-tacky, and possesses good surface slip. The composition consists of an agent which affords the basis for moistureproofness, and a film-forming substance. In the preferred embodiment, the composition also includes a solvent or solvent mixture, a plasticizer and/or a blending agent.

As the agents which afford the basis for the moistureproofness, the instant invention contemplates solid amides which are inherently moistureproof and have a melting point of at least 37° C. The molecule of the moistureproof amide is largely hydrocarbon carbon, but may contain the usual modifying groups, such as hydroxyl, carbonyl, halogen, ester, etc., providing it has a sufficiently high hydrocarbon carbon content to offset the affinity for water for these substituent groups. In so far as this specification is concerned, a hydrocarbon carbon atom is one which has at least three of its valences attached to carbon or hydrogen.

When an amide containing no modifying group in the molecule is used as the moistureproofing agent, we have found that the molecule must contain at least 17 hydrocarbon carbon atoms in the hydrocarbon portion thereof for the amide group (CON) in order to achieve a moistureproofing effect. When more than 17 hydrocarbon carbon atoms are present, better moistureproofing effects are secured.

The amides contemplated by the instant invention may be aliphatic, aromatic or mixed aliphatic-aromatic or substituted amides. Any group or atom other than hydrocarbon is considered an active group. We have found that, when the number of active groups is increased, for example, when two similar active groups are present, the limiting ratio may be 55%–66% of the limiting ratio for one such group, while for three similar active groups the limiting ratio is 45%–55% and approaches a limiting value of 30% as the number of similar active groups is further increased. When different active groups are introduced, the limiting ratio of hydrocarbon carbon atoms will vary, depending on the nature and number of such groups. Thus, for example, if two different active groups are present, the limiting ratio of hydrocarbon carbon atoms to active groups will be 55%–66% of the mean of the limiting ratios for each of the individual active groups.

Stearamide, N-butyl stearamide and stearanilide are specific illustrative examples of amides which are moistureproof and can be utilized in the preparation of moistureproof films.

As previously mentioned, the composition also contains a film-forming substance. As illustrative examples of film-forming substances may be mentioned cellulose derivatives, for example, cellulose nitrate, cellulose acetate, ethyl cellulose, benzyl cellulose, mixed esters or ether esters; resins, either natural or synthetic, such as rosin, hydrogenated rosin and its derivatives, including glycerol, glycol or diethylene glycol esters of hydrogenated rosin; rosin esters of glycerol, glycol or diethylene glycol; gum dammar; polybasic acid-polyhydric alcohol resins, either modified or unmodified; vinyl resins of the polymerized vinyl acetate, polymerized chlor-vinyl acetate and polymerized vinyl acetal resin types; metastyrene resin; phenolic condensation products; rubber, gutta percha, balata, caoutchouc; synthetic rubbers including polymers of isoprene, butadiene and their homologues; chemical derivatives of rubber, such as halogenated rubber, rubber treated with sulphuric acid, rubber treated with tin tetrachloride; rubber treated with chlorostannic acid; varnishes; etc. One or a plurality of film-forming ingredients may be used. The precise film-forming ingredient or mixture thereof depends upon the purpose for which the compositions are to be used.

When the composition contains a softener, any suitable softener for the film-forming ingredients may be used. For example, diamyl phthalate, tricresyl phosphate, dicyclohexyl phthalate, butyl benzoyl benzoate, etc., may be used, when the film-forming ingredient is a cellulose derivative.

In some compositions wherein a cellulose derivative is used, the film which is produced may be hazy. If desired, this may be overcome by incorporating in such a composition a blending agent. Such compositions also are generally more moistureproof than those without the blending agent or gum. The blending agent tends to improve the compatibility of the moistureproofing agents with the other ingredients in the film and consequently the impermeability of the film. As several illustrative examples of blending agents may be mentioned gums or resins, such as dammar, gum elemi, ester gum, hydrogenated rosin; hydrogenated ester gum or the like, halogenated diphenyl, a natural occurring balsam or a synthetic balsam-like substance, such as diethylene glycol hydrorosinate, or a substance such as lanum, hydrogenated castor oil, di-dodecyl phthalate, retene, diricinoleic ester of glycerol or the like.

The ingredients which constitute the final film may be dissolved in an appropriate solvent or solvent mixture to form a solution which may be used as herein described. Alternatively, the ingredients constituting the final film may be used in the form of a melt. When the composition is to be used in the form of a melt, it is desirable to include therein a blending agent to inhibit crystallization. Hydrogenated rubber, hydrogenated ester gum, rosin, dammar, diethylene glycol hydrorosinate and the like, are several illustrative examples of crystallization inhibitors. Whenever the composition is in the form of a lacquer and used for coating purposes, the solvents thereof are chosen so that they will not produce any deleterious effects on the base being coated.

The proper formulation of the lacquer so that it will yield coatings which are transparent and highly moisture-proof is determined by tests. One of the most important things to be determined is the proper amount of blending agent to be used. This can be determined, for example, as follows: A series of compositions is prepared containing the same amounts of lacquer base, softener, moistureproofing agent and solvent. Different quantities of blending agent are then added to each of these lacquers and the general properties, such as transparency and the permeability values of sheets of regenerated cellulose, for example, coated with each of these compositions, are plotted against the ratio of blending agent to moistureproofing agent used.

When a lacquer of the type described in Example IV is modified according to this systematic procedure, it will be found that the lowest permeability value occurs very near the point where the coatings become completely transparent. In the case of N-butyl stearamide in this particular composition, this point is equivalent to approximately 2.00 to 5 grams of dammar to 1 gram of N-butyl stearamide. It is obvious that this optimum blending agent-moistureproofing agent ratio will vary for different moistureproofing agents and for different blending agents with the same moistureproofing agent. In general, this ratio depends upon the hydrocarbon carbon content and the solubility of the moistureproofing agent in the lacquer solids. Thus, the ratio is high for moistureproofing agents having high hydrocarbon carbon content and low for moistureproofing agents which are quite soluble or compatible with the other constituents of the coating. Undoubtedly, other factors, such as melting point, solvent composition of the lacquer, type of lacquer base used, choice of plasticizer, etc., also affect this optimum ratio, but the two considerations mentioned above seem to be the more important ones.

A series of experiments, based on the composition of Example IV will, of course, have a pyroxylin lacquer base and a pyroxylin-moistureproofing agent ratio of 5.26:1. Obviously, this ratio can also be varied and the relations between permeability value and the blending agent-moistureproofing agent ratio determined for sheets of regenerated cellulose coated with a series of lacquers having a different lacquer base-moistureproofing agent ratio to which various amounts of dammar or other blending agent have been added. These relations will have the same general character but it will be found generally that, as the lacquer base-moistureproofing agent ratio is increased (decreasing the quantity of moistureproofing agent), the permeability values will be higher for a given blending agent-moistureproofing agent ratio and will eventually pass out of the moistureproof limit. On the other hand, decreasing this ratio (increasing the moistureproofing agent) does not decrease the permeability values indefinitely and, after a certain point is reached, may even decrease the moistureproofness. Experiments have shown that the optimum lacquer base-moistureproofing agent ratio usually falls within the limits 1:10 to 200:1 and the blending agent-moistureproofing agent ratio lies between the limits of 0:1 to 10:1. The most satisfactory cellulose derivative base-moistureproofing lacquers generally fall within these limits for nearly all moistureproofing agents, the optimum pyroxylin-moistureproofing agent ratios being of the order of 2:1 to 30:1. However, for certain purposes, for example, compositions for casting moistureproof foil, the ratios may differ greatly from those given above and we do not intend that we should be confined to these limits which are suggested merely as an aid to the proper formulation of moistureproofing lacquers.

The above or any other method for determining the most satisfactory formula in which to use any moistureproofing agent to achieve minimum permeability and maximum clarity of coating may be used. The above discussion is merely given as one systematic method, whereby the compositions may be formulated with the moistureproofing agents here disclosed. Different moistureproofing agents will yield different data on such a series of experiments as this, and moistureproofing agents of different chemical constitution will be formulated differently into various dopes or vehicles. There is thus no single composition such as has been described above which is capable of universal application. The specific examples hereafter given are thus illustrative, and the above-described method of systematically varying the compositions of solids in which a moistureproofing agent is used is exemplary of a general method, whereby optimum results may be achieved with an agent. The method is, of course, capable of extension to include variations of any of the solid lacquer ingredients, or even to include solvents and the solvent composition. Thus, when one skilled in the art is taught by these disclosures, he will be able to formulate a variety of compositions containing any of the moistureproofing agents or to determine those compositions with which our moistureproofing agents are most advantageously used. A moistureproofing agent is thus not a material which will always and universally produce moistureproof coatings utterly regardless of the composition in which it is used. It usually requires to be formulated in certain favorable compositions to bring out its inherent moistureproofing properties. On the other hand, a substance which is not inherently moistureproof cannot by any extended amount of work in formulation be made to yield moistureproof films or coatings. Thus, when we speak of the inherent property of a compound to moistureproof, we are concerned with a specific inherent property which permits it to be used with some film-forming vehicle to produce moistureproof coatings.

The composition can be used for the production of films, either by casting it in the well-known manner to produce self-sustaining films, or by coating it on to the selected base. When the composition is to be used as a coating, any suitable base material, paper, highly calendered paper, glassine, leather, fabrics, etc., may be used. The compositions may even be applied to metals to prevent them from rust by virtue of their moistureproofing property. They may also be used to coat individual fibers of cotton, wool or artificial silk in such a manner as to make them moistureproof. In the preferred embodiment of the invention, when a transparent wrapping tissue is desired, the base may consist of thin, dense, non-fibrous, substantially non-porous and preferably transparent sheeting formed of a cellulosic, albuminous or other material. As illustrative examples of cellulosic sheeting may be mentioned cellulosic sheeting coagulated or precipitated from an aqueous dispersion or solution of a cellulosic material, for example, sheeting of regenerated cellulose, glycol cellulose, cellulose glycollic acid, lowly etherified or esterified cellulose, such as lowly methylated cellulose; and sheeting of cellulose derivatives, such as cellulose acetate, cellulose nitrate, ethyl cellulose, benzyl cellulose. Gelatin and casein, hardened or not as desired, are mentioned as illustrative examples of albuminous materials. Sheeting of rubber or rubber derivatives may also be used as the base.

When a selected base, as for example regenerated cellulose sheeting, is to be moistureproofed by the compositions hereinbefore described, the composition is applied to the regenerated cellulose sheeting in any suitable manner, such as immersion, spraying, brushing, etc. The lacquer may be, if necessary, maintained at the time of application at an elevated temperature in order to prevent separation of the moistureproofing ingredients. The excess composition is removed by any suitable means and substantially all the volatile solvents are removed from the composition at an elevated temperature, for example, 90° C.–110° C., in order to prevent separation or crystallization of the moistureproofing agent during evaporation of the solvent. It is also preferable to use air low in moisture content during the drying operation in order to obtain evaporation of the solvent without film blush. After being dried, the product, if the base is of the type which loses moisture at elevated temperatures, may be subjected to a humidifying treatment or other meeans for a sufficient time to impart or restore flexibility and to deodorize. In some cases, the lacquer-coated materials may be air-dried at room temperature, in which case the humidifying treatment is not needed.

Hereafter, there are set forth several illustrative specific examples in order to more clearly explain the invention.

*Example I*

(A) A composition consisting of the following ingredients in approximately the proportions set forth is prepared in any convenient and appropriate manner:

| | Parts by weight |
|---|---|
| Pyroxylin | 5.26 |
| Gum dammar | 3.25 |
| Dibutyl phthalate | 2.32 |
| N-butyl stearamide | 1.00 |
| Ethyl acetate | 46.25 |
| Toluene | 36.00 |
| Alcohol | 6.28 |
| Acetone | 0.68 |

A transparent sheet of regenerated cellulose is submerged in this lacquer which, for convenience, is maintained at a temperature of 40° C. in order to prevent separation of the moistureproofing agent. The excess lacquer is removed by suitable means and the coated sheet is dried, preferably promptly, at an elevated temperature and preferably also in air at 90° C.–100° C. The coated sheet is glass-clear in transparency, flexible, non-tacky, glossy, possesses good surface slip and is only approximately 0.00005" to 0.00015" thicker than the uncoated sheet and it is practically impossible to distinguish the coated sheet from the uncoated sheet in appearance. However, the coated sheet is moistureproof, having a permeability value of less than 570, for example of the order of 200 or less.

The coated sheet is much more resistant to the passage of water vapor than a similar sheet coated with the same lacquer, except for the omission of N-butyl stearamide or a sheet coated with a high grade waterproof spar varnish. A sheet coated with the lacquer without the addition of N-butyl stearamide will have a permeability value of 4,000 to 5,000, while the sheet coated with a waterproof spar varnish will have a permeability value of from 2,000 to 4,000.

(B) N-butyl stearamide in Example I(A) is substituted by an equal amount of stearamide. The process of Example I(A) is utilized to coat the transparent regenerated cellulose sheeting. The product possesses the same characteristics as the product of Example I(A). The product produced by the instant example has a permeability value of the order of 570 or less.

(C) In Example I(A) substitute an equal amount of stearanilide for the N-butyl stearamide. The process of Example I(A) is used to coat the transparent regenerated cellulose sheeting. The product possesses the same characteristics and properties as that of Example I(A) except that the product produced by the instant example has a permeability value of the order of 570 or less.

*Example II*

A composition consisting of the following ingredients in approximately the proportions set forth is prepared by any well-known procedure:

| | Parts by weight |
|---|---|
| Ethyl cellulose | 6.0 |
| Rosin | 3.6 |
| Tricresyl phosphate | 1.0 |
| Stearanilide | 1.0 |
| Toluene | 60.0 |
| Alcohol | 19.0 |
| Ethyl lactate | 10.0 |

Transparent sheets of regenerated cellulose are coated and treated in the manner described in Example I(A). The product is transparent, flexible, glossy, has a good surface slip and a permeability value of the order of 285 or less.

Further, compositions of this type may be used for protecting steel and other corrodible metals against rust or the like. The coatings may be air-dried at room temperature for 5 minutes and are 20 times as impermeable to the diffusion of moisture vapors as similar coatings containing no moistureproofing agent.

The omission of ethyl lactate from the above composition will provide a composition suitable for coating sheets of cellulose acetate and such coated sheets will have a permeability value of not more than 570 and of the order of 285 or less. This product is also transparent, flexible, glossy, non-tacky and possesses good surface slip.

As previously explained, in many cases it may be desirable to omit the gum or resin entirely, though when used it may materially improve the transparency of the final product.

*Example III*

A composition consisting of the following ingredients in approximately the proportions set forth is prepared in any well known manner:

| | Parts by weight |
|---|---|
| Ethyl cellulose | 7.0 |
| Dibutyl phthalate | 2.0 |
| N-butyl stearamide | 1.0 |
| Toluene | 62.0 |
| Alcohol | 21.0 |

Cellulose acetate sheeting is coated with this lacquer in accordance with the procedure outlined in Example I(A). The product, after being dried at room temperature, is flexible, glossy, has good surface slip and a permeability value of the order of 285 or less.

*Example IV*

A composition consisting of the following ingredients in approximately the proportions set forth is prepared in any well known manner:

| | Parts by weight |
|---|---|
| Pyroxylin | 5.26 |
| Dibutyl phthalate | 2.32 |
| N-butyl stearamide | 1.00 |
| Ethyl acetate | 46.25 |
| Toluene | 36.00 |
| Alcohol | 6.28 |
| Acetone | 0.68 |

A highly calendered smooth paper is provided with a continuous layer of this lacquer by coating with or without impregnation, and then drying at 90° C.–100° C. The product has a permeability value of the order of 380 or less.

The compositions described in Examples III and IV yield coatings which may be slightly hazy. If transparency is essential, a blending agent of the type above mentioned may be incorporated in these compositions. Thus, for example, the lacquer described in Example IV may be so modified that it always will yield a transparent coating by the addition of a blending agent, such as dammar; the quantity of dammar or other blending agent added must be determined as previously described.

The following is an example of a composition wherein a polybasic acid-polyhydric alcohol resin constitutes the film-forming ingredient. This composition consisting of the following ingredients in approximately the proportions given is prepared in any suitable manner:

| | Parts by weight |
|---|---|
| *Perilla oil polybasic acid-polyhydric alcohol resin varnish | 50 |
| Stearanilide | 1 |
| Toluene | 50 |

*The perilla oil polybasic acid-polyhydric alcohol resin varnish is prepared from the following ingredients:

| | Parts by weight |
|---|---|
| Perilla oil | 329.0 |
| Phthalic anhydride | 472.5 |
| Glycerin | 204.6 |
| Sodium hydroxide | 0.7 |
| Metallic cobalt (added as linoleate) | 0.7 |
| Ethyl acetate | 800.0 |

*The procedure for preparing the perilla oil polybasic acid-polyhydric alcohol resin varnish is as follows: Heat 72.6 parts of C. P. Glycerin to 350° F. in closed kettle-condenser and stirrer. At 350° F. add NaOH, followed by perilla oil. Stir rapidly and heat to 437° F. Hold until clear (15–30 minutes). Add phthalic anhydride and heat to 392° F. Add residue of glycerin to batch. Heat to 392° F. and hold (5 hours). Acid number 45–55. Cool to 175° F. Cut with ethyl acetate. Add drier and centrifuge. (Solids 50%.)

Regenerated cellulose sheeting coated with this composition as explained under Example I(A) and dried at room temperature or at 90° C.–110° C. produces a product having a permeability value of the order of 570 or less. A composition of this type may be used without blending agents, but in some cases it is advantageous to use a small amount of a blending agent. Usually, compositions of this nature are sufficiently flexible without the addition of a plasticizer. Lacquers of this type may be used when particularly good adhesion is desired.

As previously mentioned, another method of obtaining articles which are of themselves moistureproof is the casting of films containing the organic amides as moistureproofing agents. The compositions given in Examples I–IV inclusive may be used for this purpose. It is usually desirable, however, to employ a higher solids base solution for casting sheets than is ordinarily used for forming thin coatings. Furthermore, in view of the greater thickness of cast foils as compared to coatings, a smaller proportion of the moistureproofing agent is used in order to obtain transparency and a high degree of moistureproofness, and this in turn will require the use of a smaller quantity of blending agent and/or the use of blending agents other than hard gums in appreciable quantities. Those skilled in the art will be able to formulate by tests satisfactory compositions for the preparation of cast sheets.

The cast sheets and protective coatings prepared in accordance with the instant invention have the ability to resist the transmission or diffusion of water vapor to an extent at least 4 times that displayed by sheets of equal thickness and produced from similar or prior art compositions formulated without the addition of moistureproofing agents. The value "4" merely sets forth the minimum improvement and does not limit the higher moistureproofness that can be obtained. The moistureproofing agents herein described are capable of being formulated into films showing improvement over prior art films produced from compositions formulated without the addition of moistureproofing agents not only 4 but 10, 20, 40 and in some cases even 100 fold. This is truly a remarkable accomplishment.

The compounds described in this application as moistureproofing agents have many advantages. Moistureproofing compositions containing the moistureproofing agents are easily duplicated. As previously stated, these compositions in certain formulations thereof yield coatings which air-dry at ordinary temperatures. For certain purposes where it is not feasible to force-dry the coatings, this becomes especially important. As for the moistureproofing agents themselves, they are generally colorless, odorless, tasteless, nonvolatile, and essentially non-toxic, at least in the quantities in which they are used, and they can be reproduced synthetically with a high degree of uniformity and consistency.

In the definition hereinbefore set forth, it is to be understood that the permeability value of 570 represents only the maximum value. In many cases permeabilities of 235, 140, 57, 30 or indeed less may be obtained.

When bases of the preferred type are utilized, the ultimate product is admirably suited for use as a transparent moistureproof wrapping tissue.

Since it is obvious that various changes and modifications may be made in the above description without departing from the nature or spirit thereof, this invention is not restricted thereto except as set forth in the appended claims.

We claim:

1. An article of manufacture comprising a continuous moistureproof unbroken solid film comprising a film-forming substance and an inherently moistureproof N-aryl substituted amide having a melting point of at least 37° C. as the moistureproofing agent, said amide containing no modifying groups in the molecule, having at least 17 hydrocarbon carbon atoms for the CON group and being present in an amount to impart moistureproofness to the article.

2. An article of manufacture comprising a continuous moistureproof unbroken solid film comprising a film-forming substance, an inherently moistureproof N-aryl substituted amide having a melting point of at least 37° C. as the moistureproofing agent, and a blending agent, the ratio of the quantity of film-forming substance to the quantity of amide being within the limits of 1:10 to 200:1, and the ratio of the quantity of blending agent to the quantity of amide being within the limits of 0:1 to 10:1, said amide containing no modifying groups in the molecule, having at least 17 hydrocarbon carbon atoms for the CON group and being present in an amount to impart moistureproofness to the article.

3. An article of manufacture comprising a continuous moistureproof unbroken solid film comprising pyroxylin, an inherently moistureproof N-aryl substituted amide having a melting point of at least 37° C. as the moistureproofing agent, and a blending agent, the ratio of the quantity of pyroxylin to the quantity of amide being within the limits of 2:1 to 30:1, said amide containing no modifying groups in the molecule, having at least 17 hydrocarbon carbon atoms for the CON group and being present in an amount to impart moistureproofness to the article.

4. An article of manufacture comprising a base having a moistureproof coating comprising a film-forming substance and an inherently moistureproof N-aryl substituted amide having a melting point of at least 37° C. as the moistureproofing agent, said amide containing no modifying groups in the molecule, having at least 17 hydrocarbon carbon atoms for the CON group and being present in an amount to impart moistureproofness to the article.

5. An article of manufacture comprising a transparent non-fibrous base sheet or film having a transparent moistureproof coating comprising a film-forming substance and an inherently moistureproof N-aryl substituted amide having a melting point of at least 37° C. as the moistureproofing agent, said amide containing no modifying groups in the molecule, having at least 17 hydrocarbon carbon atoms for the CON group and being present in an amount to impart moistureproofness to the article.

6. An article of manufacture comprising a transparent regenerated cellulose base sheet or film having a transparent moistureproof coating comprising a film-forming substance and an inherently moistureproof N-aryl substituted amide having a melting point of at least 37° C. as the moistureproofing agent, said amide containing no modifying groups in the molecule, having at least 17 hydrocarbon carbon atoms for the CON group and being present in an amount to impart moistureproofness to the article.

7. An article of manufacture comprising a continuous moistureproof unbroken film comprising a film-forming substance and stearanilide as the moistureproofing agent, said stearanilide being present in an amount to impart moistureproofness to said article.

8. An article of manufacture comprising a transparent non-fibrous base sheet or film having a continuous transparent moistureproof coating comprising a film-forming substance and stearanilide as the moistureproofing agent, said stearanilide being present in an amount to impart moistureproofness to said article.

9. An article of manufacture comprising a continuous moistureproof unbroken solid film comprising a film-forming substance, a solid inherently moistureproof N-aryl substituted amide having a melting point of at least 37° C. as the moistureproofing agent, and a blending agent, said amide containing no modifying groups in the molecule and being selected from the group of inherently moistureproof N-aryl substituted amides which consists of (1) inherently moistureproof amides containing one CON group and at least 17 hydrocarbon carbon atoms for the CON group; (2) inherently moistureproof amides containing two CON groups and at least approximately 9 hydrocarbon carbon atoms for each CON group; (3) inherently moistureproof amides containing three CON groups and at least approximately 8 hydrocarbon carbon atoms for each CON group; and (4) inherently moistureproof amides containing more than three CON groups and at least 5 hydrocarbon carbon atoms for each CON group, said amide being present in an amount to impart moistureproofness to said article.

10. An article of manufacture comprising a base having a continuous unbroken moistureproof coating comprising a film-forming substance, a solid inherently moistureproof N-aryl substituted amide having a melting point of at least 37° C. as the moistureproofing agent, and a blending agent, said amide containing no modifying groups in the molecule and being selected from the group of inherently moistureproof N-aryl substituted amides which consists of (1) inherently moistureproof amides containing one CON group and at least 17 hydrocarbon carbon atoms for the CON group; (2) inherently moistureproof amides containing two CON groups and at least approximately 9 hydrocarbon carbon atoms for each CON group; (3) inherently moistureproof amides containing three CON groups and at least approximately 8 hydrocarbon carbon atoms for each CON group; and (4) inherently moistureproof amides containing more than three CON groups and at least 5 hydrocarbon carbon atoms for each CON group, said amide being present in an amount to impart moistureproofness to said article.

11. An article of manufacture comprising a transparent non-fibrous base sheet or film having a continuous transparent moistureproof coating comprising a film-forming substance, a solid inherently moistureproof N-aryl substituted amide having a melting point of at least 37° C. as the moistureproofing agent, and a blending agent, said amide containing no modifying groups in the molecule and being selected from the group of inherently moistureproof N-aryl substituted amides which consists of (1) inherently moistureproof amides containing one CON group and at least 17 hydrocarbon carbon atoms for the CON group; (2) inherently moistureproof amides containing two CON groups and at least approximately 9 hydrocarbon carbon atoms for each CON group; (3) inherently moistureproof amides containing three CON groups and at least approximately 8 hydrocarbon carbon atoms for each CON group; and (4) inherently moistureproof amides containing more than three CON groups and at least 5 hydrocarbon carbon atoms for each CON group, said amide being present in an amount to impart moistureproofness to said article.

WILLIAM HALE CHARCH.
MERLIN MARTIN BRUBAKER.
FREDERICK M. MEIGS.